United States Patent
Ide et al.

(10) Patent No.: US 12,152,668 B2
(45) Date of Patent: Nov. 26, 2024

(54) SHIFT DEVICE

(71) Applicant: KABUSHIKI KAISHA TOKAI-RIKA-DENKI-SEISAKUSHO, Aichi (JP)

(72) Inventors: Hirofumi Ide, Aichi-ken (JP); Yoshihiro Noda, Aichi-ken (JP); Atsushi Toyama, Aichi-ken (JP); Shori Kato, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 17/679,621

(22) Filed: Feb. 24, 2022

(65) Prior Publication Data

US 2022/0275861 A1 Sep. 1, 2022

(30) Foreign Application Priority Data

Feb. 26, 2021 (JP) ................................ 2021-030764

(51) Int. Cl.
*F16H 59/10* (2006.01)
*F16H 59/02* (2006.01)

(52) U.S. Cl.
CPC ......... *F16H 59/0278* (2013.01); *F16H 59/10* (2013.01); *F16H 2059/0282* (2013.01)

(58) Field of Classification Search
CPC ............. F16H 59/0278; F16H 59/10; F16H 2059/0282; F16H 2059/048; F16H 61/18; F16H 2061/185
See application file for complete search history.

(56) References Cited

U.S. PATENT DOCUMENTS

| | | | | |
|---|---|---|---|---|
| 6,404,354 B1* | 6/2002 | Decker | ................ | G05G 5/03 200/43.11 |
| 6,848,331 B2* | 2/2005 | Syamoto | ............ | F16H 59/0204 74/473.23 |
| 7,568,404 B2* | 8/2009 | Grossman | ............... | F16H 61/22 74/473.23 |
| 9,810,314 B2* | 11/2017 | Behounek | ............... | F16H 59/08 |

(Continued)

FOREIGN PATENT DOCUMENTS

JP S64-035134 U 3/1989
JP H05-248521 A 9/1993

(Continued)

OTHER PUBLICATIONS

An Office Action; "Notice of Reasons for Refusal," mailed by the Japanese Patent Office on Jul. 23, 2024, which corresponds to Japanese Patent Application No. 2021-030764 and is related to U.S. Appl. No. 17/679,621; with partial English language translation.

*Primary Examiner* — Gregory Robert Weber

(74) *Attorney, Agent, or Firm* — Studebaker & Brackett PC

(57) ABSTRACT

There is provided a shift device including: a shift body configured to be moved to change a shift position; a first locking mechanism provided with a first lock member, the first lock member being disposed at a first locking position to lock movement of the shift body from a first shift position; and a second locking mechanism provided with a second lock member, the second lock member being disposed at a second locking position to lock movement of the shift body from a second shift position.

9 Claims, 16 Drawing Sheets

(56) References Cited

U.S. PATENT DOCUMENTS

| | | | | |
|---|---|---|---|---|
| 9,970,537 | B2 * | 5/2018 | Beattie | F16H 61/22 |
| 10,088,040 | B2 * | 10/2018 | Mitteer | F16H 61/22 |
| 10,288,165 | B2 * | 5/2019 | Makimura | F16H 59/0278 |
| 10,378,647 | B2 * | 8/2019 | Kato | F16H 59/10 |
| 11,168,784 | B2 * | 11/2021 | Yohsuke | F16H 59/0278 |
| 11,236,822 | B2 * | 2/2022 | Morimura | F16H 59/08 |
| 2004/0079613 | A1 * | 4/2004 | Cho | F16H 61/22 |
| | | | | 192/220.7 |
| 2015/0159750 | A1 | 6/2015 | Rake et al. | |
| 2018/0094719 | A1 * | 4/2018 | Hill | F16H 59/105 |
| 2019/0249771 | A1 * | 8/2019 | Morimura | F16H 61/22 |
| 2021/0199192 | A1 * | 7/2021 | Love | F16H 59/10 |

FOREIGN PATENT DOCUMENTS

| | | | | |
|---|---|---|---|---|
| JP | 2015-522470 A | | 8/2015 | |
| WO | WO-2017055898 A1 * | | 4/2017 | F16H 59/08 |
| WO | WO-2017127052 A1 * | | 7/2017 | F16H 59/10 |

* cited by examiner

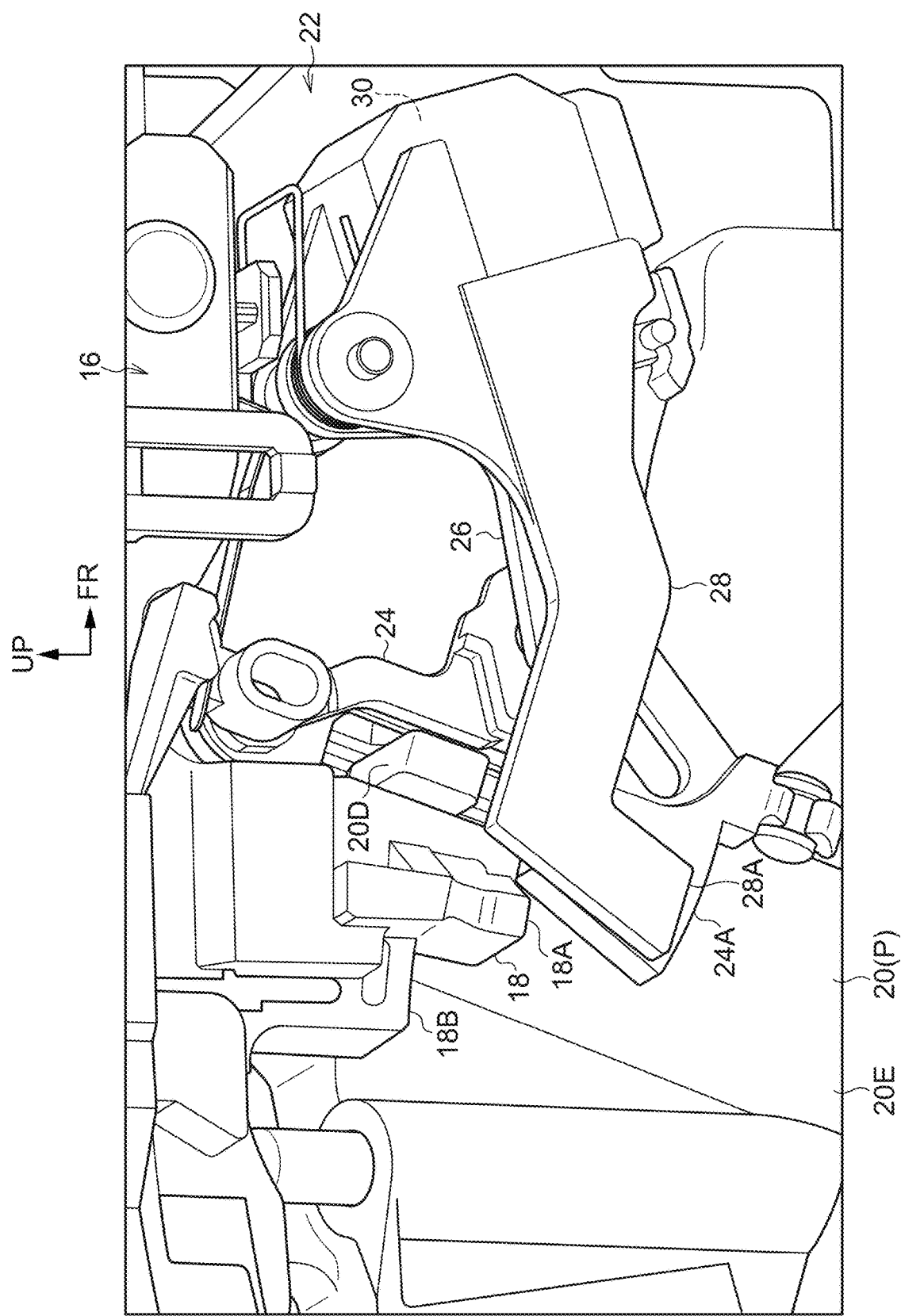

SHIFT DEVICE

CROSS-REFERENCE TO RELATED APPLICATION

This application is based on and claims priority under 35 USC 119 from Japanese Patent Application No. 2021-030764 filed on Feb. 26, 2021, the disclosure of which is incorporated by reference herein.

BACKGROUND

Technical Field

The present disclosure relates to a shift device in which a shift body is moved to change a shift position of a shift body.

Related Art

In a shift lever device disclosed in Japanese National Phase Publication No. 2015-522470, a lock recess and a second lock recess are provided to a body of a shift lever. A lock element of a control unit is inserted into the lock recess to lock movement of the shift lever from a shift lever position P. Furthermore, a lock element of the control unit is inserted into the second lock recess to lock movement of the shift lever from a shift lever position N.

Note that in this shift lever device, the lock recess and the second lock recess are respectively provided to the body so as to correspond to the shift lever position P and the shift lever position N of the shift lever. Thus, a positional relationship between the lock recess and the second lock recess on the body matches a positional relationship between the shift lever position P and the shift lever position N of the shift lever.

SUMMARY

In consideration of the above circumstances, an object of the present disclosure is to obtain a shift device that enables greater degrees of freedom for configuration of a shift body.

A shift device of a first aspect of the present disclosure includes a shift body, a first locking mechanism, and a second locking mechanism. The shift body is configured to be moved to change a shift position. The first locking mechanism is provided with a first lock member, the first lock member being disposed at a first locking position to lock movement of the shift body from a first shift position. The second locking mechanism is provided with a second lock member, the second lock member being disposed at a second locking position to lock movement of the shift body from a second shift position.

A shift device of a second aspect of the present disclosure is the shift device of the first aspect of the present disclosure, wherein the first locking mechanism and the second locking mechanism are actuated at the same time.

A shift device of a third aspect of the present disclosure is the shift device of the first aspect or the second aspect of the present disclosure, wherein at least one mechanism out of the first locking mechanism or the second locking mechanism is actuated irrespective of the shift position of the shift body.

A shift device of a fourth aspect of the present disclosure is the shift device of any one of the first aspect to the third aspect of the present disclosure, wherein in cases in which the first shift position is a park position and the first lock member is disposed at the first locking position, the first lock member permits movement of the shift body to the first shift position from a position other than the first shift position.

A shift device of a fifth aspect of the present disclosure is the shift device of any one of the first aspect to the fourth aspect of the present disclosure, wherein in cases in which the second shift position is a neutral position and the second lock member is disposed at the second locking position, the second lock member permits movement of the shift body to the second shift position from a position other than the second shift position.

A shift device of a sixth aspect of the present disclosure is the shift device of any one of the first aspect to the fifth aspect of the present disclosure, further including a permitting portion that is provided to the second lock member and that is configured to permit movement of the shift body from the first shift position to the second shift position.

A shift device of a seventh aspect of the present disclosure is the shift device of any one of the first aspect to the sixth aspect of the present disclosure, further including a retaining portion that is provided to the second lock member and that is configured to retain the second lock member at a position separated from the second locking position in cases in which the shift body is disposed at a predetermined shift position other than the second shift position.

A shift device of an eighth aspect of the present disclosure is the shift device of any one of the first aspect to the seventh aspect of the present disclosure, wherein at least one mechanism out of the first locking mechanism or the second locking mechanism is disposed externally to the shift body.

In the shift device of the first aspect of the present disclosure, the shift body is moved to change the shift position of the shift body. The first lock member of the first locking mechanism is disposed at the first locking position to lock movement of the shift body from the first shift position. The second lock member of the second locking mechanism is disposed at the second locking position to lock movement of the shift body from the second shift position.

Note that movement of the shift body from the first shift position and movement of the shift body from the second shift position are locked by different mechanisms, these being the first locking mechanism and the second locking mechanism respectively. This obviates the need to provide a shift body with a configuration that matches a positional relationship between the first shift position and the second shift position of the shift body, thereby enabling greater degrees of freedom for the configuration of the shift body.

In the shift device of the second aspect of the present disclosure, the first locking mechanism and the second locking mechanism are actuated at the same time. This enables control of the first locking mechanism and the second locking mechanism to be simplified.

In the shift device of the third aspect of the present disclosure, at least one mechanism out of the first locking mechanism or the second locking mechanism is actuated irrespective of the shift position of the shift body. This enables control of the at least one mechanism out of the first locking mechanism or the second locking mechanism to be simplified.

In the shift device of the fourth aspect of the present disclosure, in cases in which the first shift position is the park position and the first lock member is disposed at the first locking position, the first lock member permits movement of the shift body to the first shift position from a position other than the first shift position. This enables the shift body to be moved to the first shift position from a position other than the first shift position, even in cases in which the first lock member is disposed at the first locking position.

In the shift device of the fifth aspect of the present disclosure, in cases in which the second shift position is the neutral position and the second lock member is disposed at the second locking position, the second lock member permits movement of the shift body to the second shift position from a position other than the second shift position. This enables the shift body to be moved to the second shift position from a position other than the second shift position, even in cases in which the second lock member is disposed at the second locking position.

In the shift device of the sixth aspect of the present disclosure, the permitting portion of the second lock member permits movement of the shift body from the first shift position to the second shift position. This enables the shift body to be moved from the first shift position to the second shift position.

In the shift device of the seventh aspect of the present disclosure, the retaining portion provided to the second lock member retains the second lock member at a position separated from the second locking position in cases in which the shift body is disposed at the predetermined shift position other than the second shift position. This enables the shift body to be moved from the predetermined shift position to the second shift position.

In the shift device of the eighth aspect of the present disclosure, the at least one mechanism out of the first locking mechanism or the second locking mechanism is disposed externally to the shift body. Thus, the at least one mechanism out of the first locking mechanism or the second locking mechanism is not disposed inside the shift body, thereby enabling the shift body to be made smaller in size.

BRIEF DESCRIPTION OF THE DRAWINGS

Exemplary embodiments of the present disclosure will be described in detail based on the following figures, wherein:

FIG. 4 is a perspective view illustrating a P-position locking unit and so on of a shift device according to an exemplary embodiment of the present disclosure, as viewed obliquely from a rear-right side;

DETAILED DESCRIPTION

Figure 1:
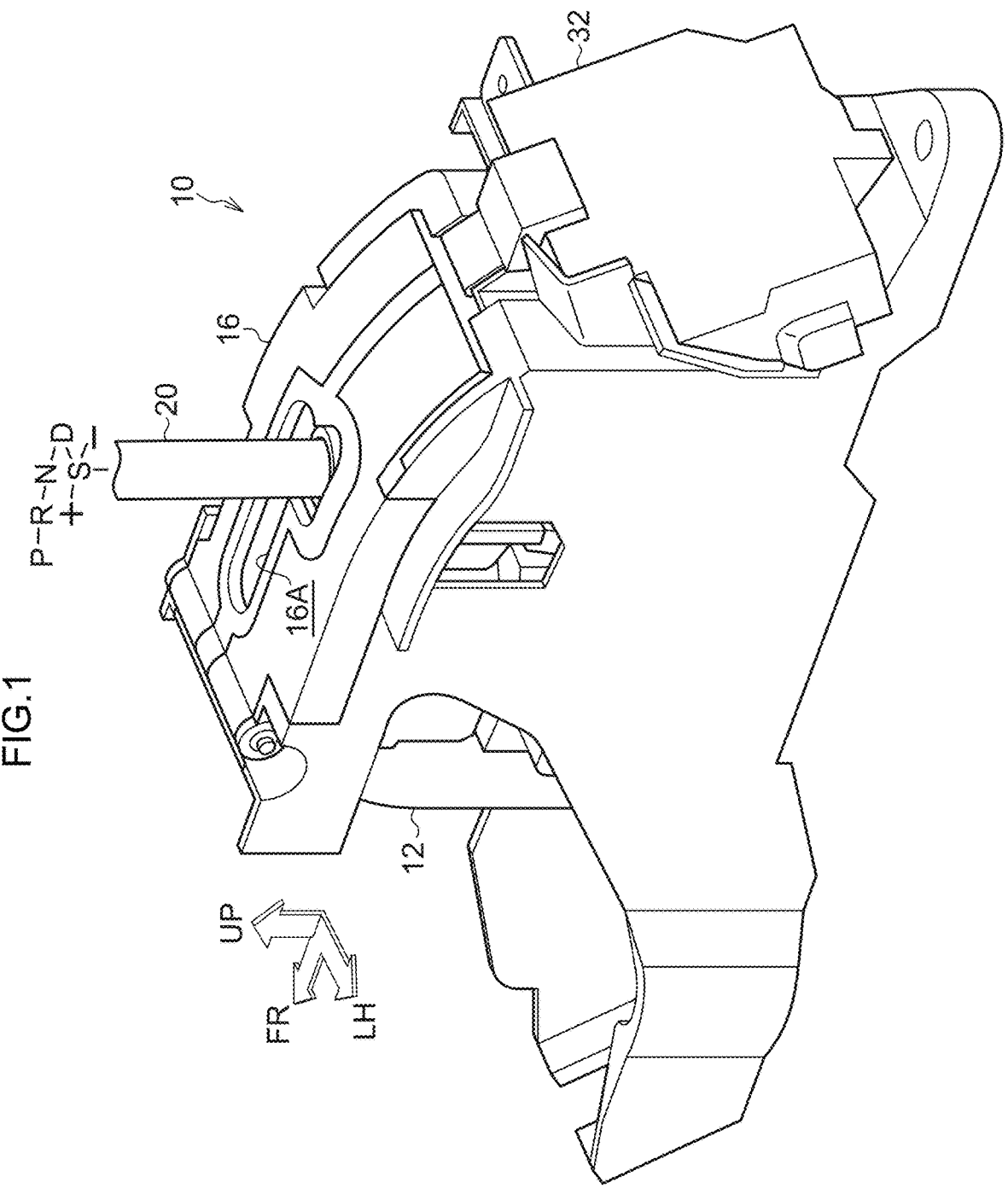
FIG. 1 is a perspective view illustrating a shift device according to an exemplary embodiment of the present disclosure, as viewed obliquely from a rear-left side.
Figure 2:
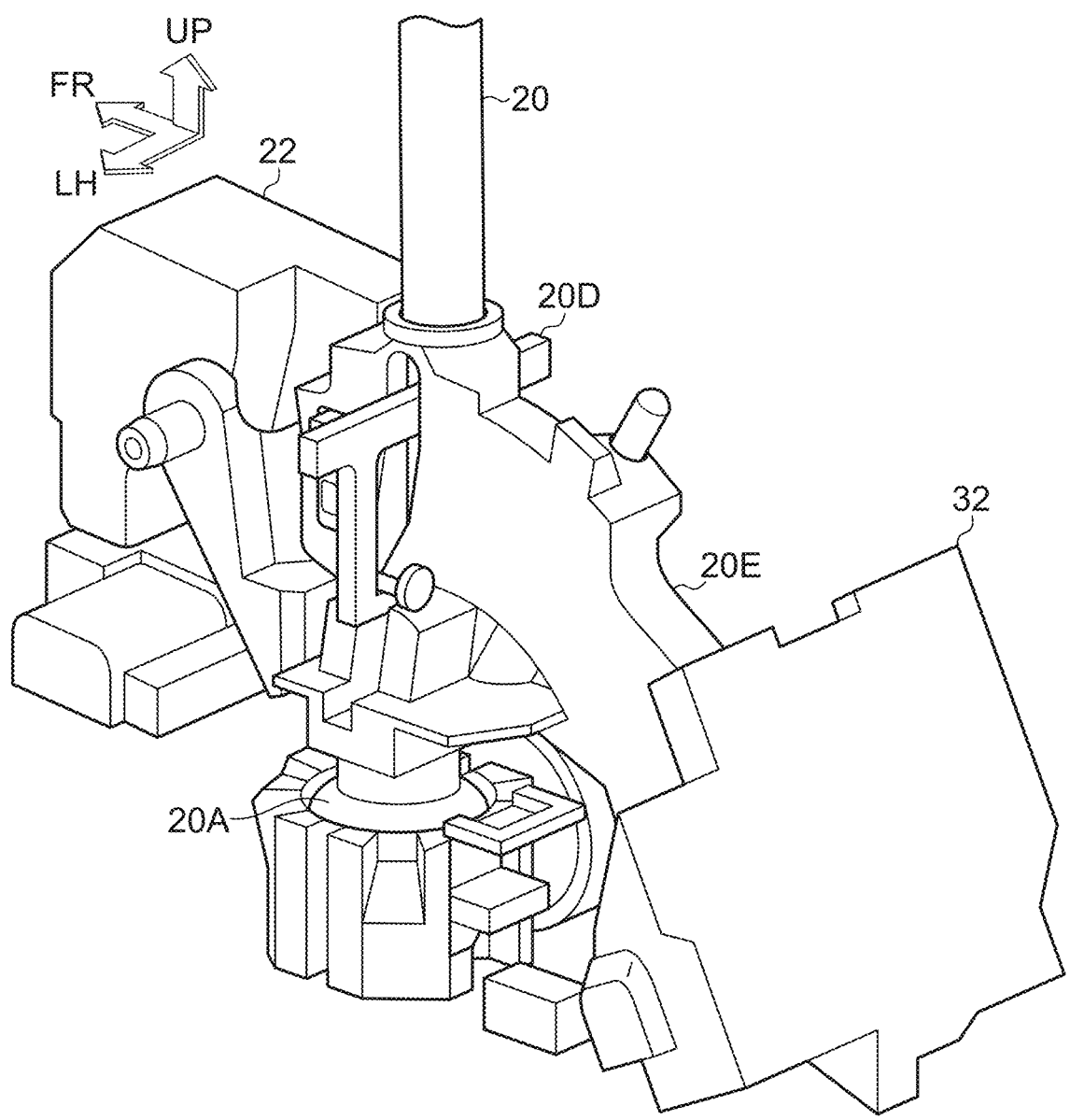
FIG. 2 is a perspective view illustrating relevant portions of a shift device according to an exemplary embodiment of the present disclosure, as viewed obliquely from a rear-left side.

FIG. 1 is a perspective view illustrating a shift device 10 according to an exemplary embodiment of the present disclosure as viewed obliquely from a rear-left side. FIG. 2 is a perspective view of relevant portions of the shift device 10 as viewed obliquely from the rear-left side. Note that in the drawings, the arrow FR indicates a front side of the shift device 10, the arrow LH indicates a left side of the shift device 10, and the arrow UP indicates an upper side of the shift device 10.

The shift device 10 according to the present exemplary embodiment is installed to a console of a vehicle. The front, left, and upper sides of the shift device 10 respectively correspond to front, left, and upper sides of the vehicle.

As illustrated in FIG. 1, the shift device 10 is provided with a substantially rectangular box-shaped plate 12, serving as a housing body. The plate 12 is fixed inside the console and an inner portion of the plate 12 is open to the upper side. A substantially rectangular opening 14 (see FIG. 7A) is formed so as to penetrate a rear wall of the plate 12. The opening 14 opens upward on progression toward the rear inside the plate 12.

A substantially rectangular plate-shaped gate plate 16, serving as a strengthening member, is fixed to an upper end portion of the plate 12. The gate plate 16 conceals the inside of the plate 12 from the upper side. The strength of the gate plate 16 is a high level that is equal to the strength of the plate 12. A gate groove 16A having a predetermined shape is formed so as to penetrate the gate plate 16.

Figure 3:
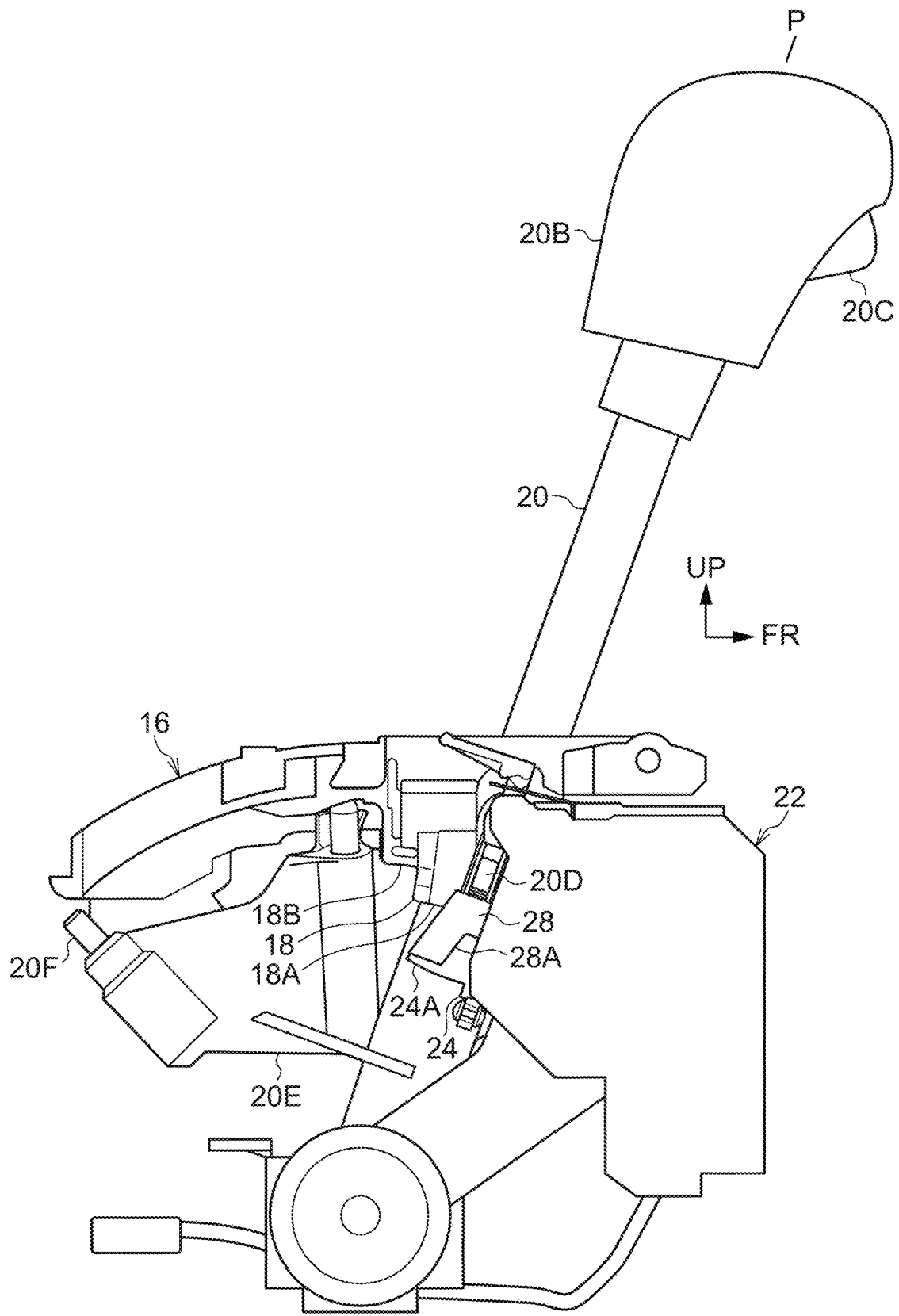
FIG. 3 is a side view illustrating a P-position locking unit and so on of a shift device according to an exemplary embodiment of the present disclosure, as viewed from a right side.

A detent protrusion 18 (see FIG. 3), serving as a restricting portion, is integrally formed to both left-right direction end portions of the gate plate 16. The detent protrusion 18 projects toward the lower side and is disposed inside the plate 12. A rectangular plate-shaped front protrusion 18A is provided to a front side portion of the detent protrusion 18, and a rectangular plate-shaped rear protrusion 18B is provided to a rear side portion of the detent protrusion 18. The front protrusion 18A and the rear protrusion 18B are integral to one another in a front-rear direction. A projection amount of the front protrusion 18A toward the lower side is greater than a projection amount of the rear protrusion 18B toward the lower side.

As illustrated in FIG. 1 and FIG. 2, a substantially rod-shaped lever 20, serving as a shift body, is provided inside the plate 12. A substantially spherical rotation shaft 20A is integrally provided to a lower end portion of the lever 20. The rotation shaft 20A is rotatably supported by a lower end portion inside the plate 12. The lever 20 is capable of pivoting (moving) centered on the rotation shaft 20A.

The lever 20 penetrates the gate groove 16A of the gate plate 16. The lever 20 is guided by the gate groove 16A so as to be capable of pivoting in the front-rear direction and the left-right direction (shift directions) over a predetermined range. Thus, in a state in which the lever 20 is not pivoted in the left-right direction, the lever 20 can be pivoted from the front side to the rear side so as to change shift positions of the lever 20 in sequence from a "P" position (park position) serving as a first shift position, to an "R" position (reverse position), an "N" position (neutral position) serving as a second shift position, and a "D" position (drive position) serving as a predetermined shift position. When the lever 20 is pivoted toward the left side (or this may be the right side) from the "D" position, the shift position of the lever 20 is changed to an "S" position (sequential position). When the lever 20 is pivoted toward either the front side or the rear side from the "S" position, the shift position of the lever 20 is changed to either a "+" position (plus position) or a "−" position (minus position) accordingly.

An upper side portion of the lever 20 extends out from the upper side of the console (into the vehicle cabin) so as to be capable of pivoting. A knob 20B (see FIG. 3), serving as a grip portion, is fixed to an upper end portion of the lever 20. The lever 20 can be pivot-operated in a state in which the knob 20B is being gripped by an occupant (in particular a driver) of the vehicle. A knob button 20C, serving as an operable portion, is provided to the knob 20B. The knob button 20C can be operated (press-operated) by the occupant.

A substantially rectangular pillar-shaped detent pin 20D, serving as a first lockable portion, is provided at a lower portion of the lever 20. The detent pin 20D penetrates the lever 20 in the left-right direction and is capable of pivoting integrally with the lever 20. The detent pin 20D is capable of moving in a pivot radial direction (select direction) of the lever 20. The detent pin 20D is biased toward the upper side so as to be disposed at a restrict position (see FIG. 5A). The detent pin 20D is mechanically linked to the knob button 20C of the knob 20B. When the knob button 20C is operated, the detent pin 20D is moved toward the lower side against the biasing force so as to be placed at a release position (see FIG. 5B).

Figure 5A:
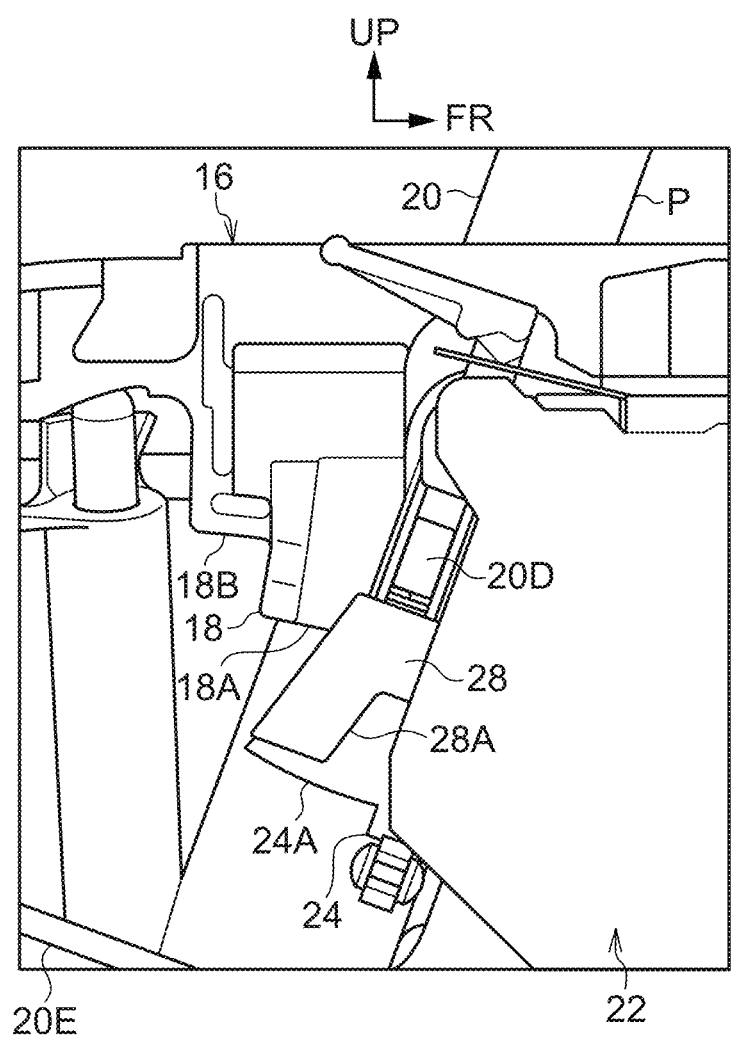
FIG. 5A and FIG. 5B are side views illustrating actions of a P-position locking unit of a shift device according to an exemplary embodiment of the present disclosure as viewed from a right side, FIG. 5A illustrating a locked state, and FIG. 5B illustrating an unlocked state.
Figure 5B:
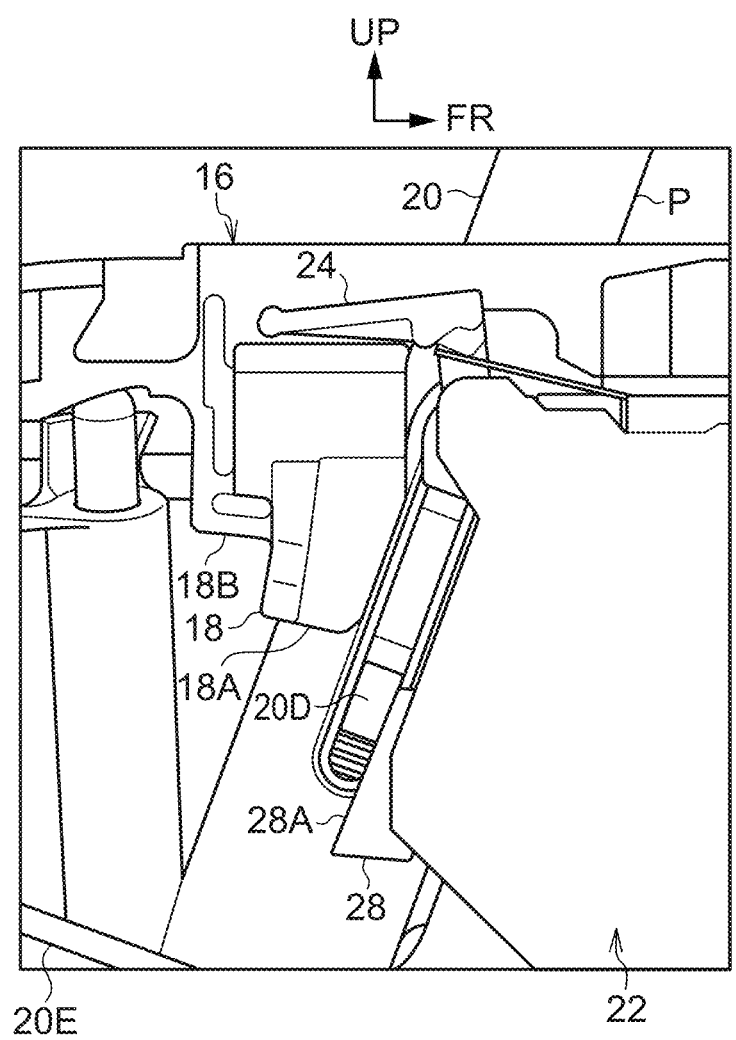

In cases in which the lever 20 is disposed at the "P" position, the detent pin 20D is disposed at the restrict position and is disposed at the front side of the detent protrusion 18 (front protrusion 18A) of the gate plate 16 (see FIG. 5A). Thus, the detent pin 20D abuts a front face of the front protrusion 18A, and pivoting of the lever 20 toward the rear side from the "P" position is restricted. When the knob button 20C is operated such that the detent pin 20D is placed at the release position (see FIG. 5B), the detent pin 20D is capable of passing by the lower side of the detent protrusion 18 (the front protrusion 18A and the rear protrusion 18B) in the front-rear direction, such that the lever 20 is capable of pivoting in the front-rear direction.

In cases in which the lever 20 is disposed at the "R" position, the detent pin 20D is located at a pivot position at the rear protrusion 18B. Thus, if the knob button 20C is not operated, the detent pin 20D abuts a rear face of the front protrusion 18A, such that pivoting of the lever 20 from the "R" position to the "P" position is restricted. In cases in which the lever 20 is disposed at the "N" position, the detent pin 20D is located at a pivot position at the rear side of the rear protrusion 18B. Thus, if the knob button 20C is not operated, the detent pin 20D abuts a rear face of the rear protrusion 18B, such that pivoting of the lever 20 from the "N" position to the "R" position is restricted.

Figure 6:
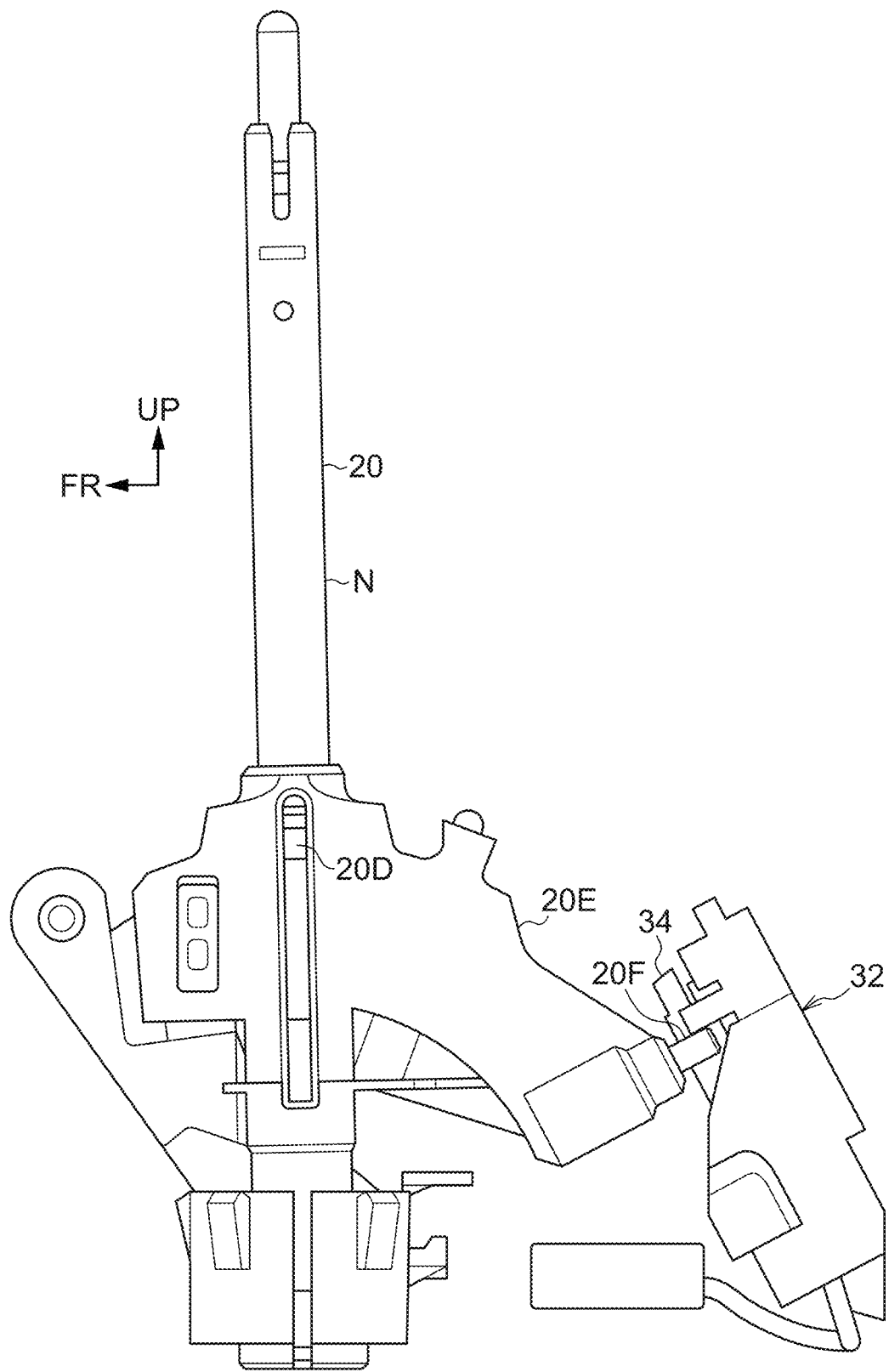
FIG. 6 is a side view of an N-position locking unit and so on of a shift device according to an exemplary embodiment of the present disclosure, as viewed from a left side.

An extension portion 20E is integrally provided to the lower portion of the lever 20. The extension portion 20E extends toward the rear side. A circular pillar-shaped lock pin 20F (see FIG. 6), serving as a second lockable portion, is fixed to a rear end portion of the extension portion 20E. The lock pin 20F projects upward on progression toward the rear. In cases in which the lever 20 is disposed at a shift position further toward the rear side than the "P" position, the lock pin 20F projects toward the upper side (rear side) of the plate 12 through the opening 14 in the plate 12.

A P-position locking unit 22 (see FIG. 3 and FIG. 4), serving as a first locking mechanism, is provided at the front and right sides of the lever 20. The P-position locking unit 22 is fixed inside the plate 12 by screw-fastening.

A substantially elongated plate-shaped P-position link 24, serving as a first lock member, is provided to the P-position locking unit 22. The P-position link 24 extends substantially along the up-down direction. An upper portion of the P-position link 24 is supported such that the P-position link 24 is capable of swinging in the front-rear direction over a predetermined range. The P-position link 24 is biased toward the rear side. Further swinging of the P-position link 24 toward the rear side is stopped, such that the P-position link 24 is disposed at a P-position locking position (first locking position). A substantially rectangular plate-shaped lock plate 24A, serving as a first lock portion, is integrally provided to a lower portion of the P-position link 24. The lock plate 24A projects toward the rear side, and is disposed at the lower side of the detent pin 20D in cases in which the lever 20 is disposed at the "P" position. An upper face of the lock plate 24A is disposed so as to be substantially perpendicular to the up-down direction. The upper face of the lock plate 24A is disposed so as to be perpendicular to the pivot radial direction of the P-position link 24 and to a movement direction of the detent pin 20D in cases in which the lever 20 is disposed at the "P" position. A rear face of the lock plate 24A slopes upward on progression toward the front side. The rear face of the lock plate 24A is sloped with respect to the pivot radial direction of the lever 20 (including the detent pin 20D).

A substantially inverted T-plate shaped intermediate link 26, serving as an intermediate member, is provided at the front side of the P-position link 24. A lower portion of the intermediate link 26 extends along substantially the front-rear direction, and an upper portion of the intermediate link 26 is supported so as to be capable of swinging in the front-rear direction. A rear end portion of the intermediate link 26 is mechanically coupled to the lower portion of the P-position link 24. Swinging of the intermediate link 26 is anchored by the P-position link 24. The rear end portion of the intermediate link 26 is capable of rotating and also capable of sliding with respect to the lower portion of the P-position link 24. When the intermediate link 26 is swung toward the front side, the P-position link 24 is swung toward the front side by the intermediate link 26.

A substantially inverted T-plate shaped release link 28, serving as a release member, is provided at the front side of the P-position link 24. A lower portion of the release link 28 extends along substantially the front-rear direction, and an upper portion of the release link 28 is supported so as to be capable of swinging in the front-rear direction over a predetermined range. A swing central axis of the release link 28 is the same as a swing central axis of the intermediate link 26. The release link 28 is biased toward the rear side, and further swinging toward the rear side is stopped. A substantially rectangular plate-shaped release plate 28A, serving as a release portion, is provided to a rear portion of the release link 28. The release plate 28A is disposed at the lower side of the detent pin 20D in cases in which the lever 20 is disposed at the "P" position. An upper face of the release plate 28A is disposed so as to be substantially perpendicular to the up-down direction at the upper side of the upper face of the lock plate 24A of the P-position link 24. The upper face of the release plate 28A is disposed so as to be perpendicular to the movement direction of the detent pin 20D in cases in which the lever 20 is disposed at the "P" position. A rear face of the release plate 28A slopes upward on progression toward the front side. The rear face of the release plate 28A is sloped with respect to the pivot radial direction of the lever 20 (including the detent pin 20D), and a front-rear direction position of the rear face substantially matches that of the rear face of the lock plate 24A.

An electromagnet 30, serving as a first operating device, is fixed to a front portion of the release link 28. The electromagnet 30 swings integrally with the release link 28. When the P-position locking unit 22 is actuated, a current is passed through the electromagnet 30, such that electromagnet 30 sticks to the intermediate link 26 as a result of the generated magnetic force, and the intermediate link 26 is capable of swinging integrally with the release link 28.

A N-position locking unit 32 (see FIG. 6 and FIG. 7B), serving as a second locking mechanism, is fixed by screw-fastening to the rear side of the plate 12.

A substantially elongated plate-shaped N-position link 34, serving as a second lock member, is provided to the N-position locking unit 32. The N-position link 34 extends upward on progression toward the front side. A rear end portion (lower end portion) of the N-position link 34 is supported such that the N-position link 34 is capable of swinging in the left-right direction over a predetermined range. The N-position link 34 is biased toward the right side, and further swinging toward the right side is stopped. A lock frame 34A that has a substantially U-plate shaped cross-section and serves as a second lock portion is provided to a front portion (upper portion) of the N-position link 34. The inside of the lock frame 34A is open toward the left side. In cases in which the lever 20 is disposed at the "N" position, the inside of the lock frame 34A opposes the right side of the lock pin 20F.

Figure 8A:
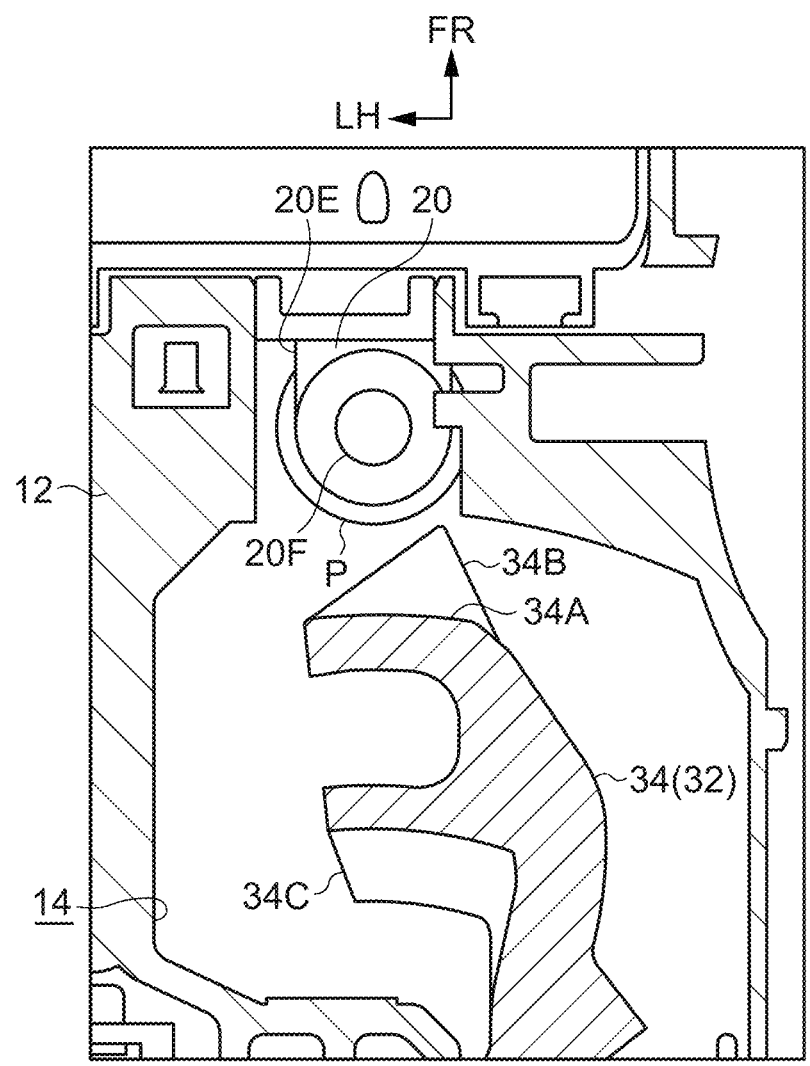
FIG. 8A and FIG. 8B are cross-sections illustrating a case in which a lever is pivoted from a "P" position to an "N" position while an N-position locking unit of a shift device according to an exemplary embodiment of the present disclosure is in a locked state as viewed from an upper side, FIG. 8A illustrating the lever disposed at the "P" position, and FIG. 8B illustrating the lever pivoted to an "R" position.
Figure 10A:
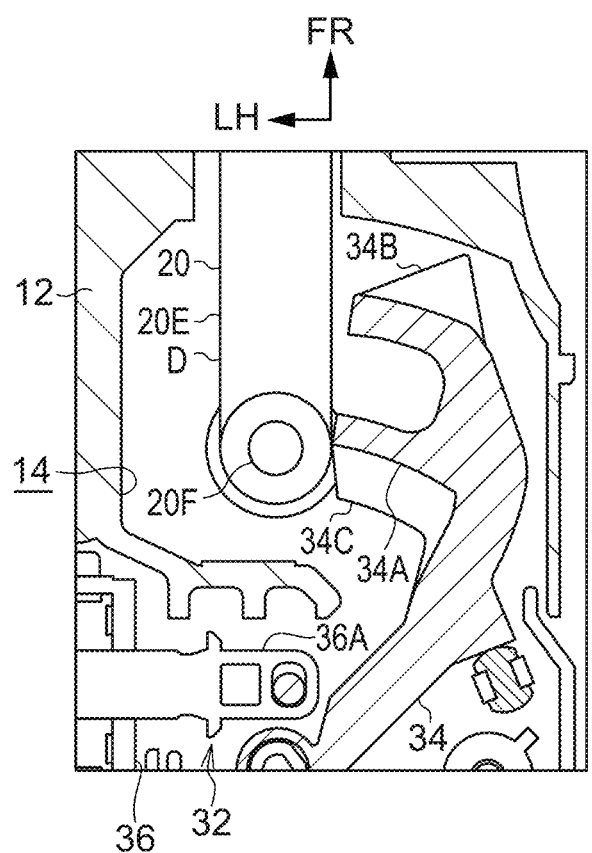
FIG. 10A to FIG. 10C are cross-sections illustrating a case in which a lever is pivoted from a "D" position to an "N" position in a shift device according to an exemplary embodiment of the present disclosure as viewed from an upper side, FIG. 10A illustrating the lever disposed at the "D" position and the N-position locking unit in an unlocked state, FIG. 10B illustrating the lever disposed at the "D" position and the N-position locking unit in a locked state, and FIG. 10C illustrating the lever disposed at the "N" position and the N-position locking unit in the locked state.

A triangular plate-shaped first permitting plate 34B (see FIG. 8A), serving as a first permitting portion (permitting portion), is integrally provided to a lower end of a front wall of the lock frame 34A. The first permitting plate 34B projects toward the front side, and has a left face that slopes toward the left side on progression toward the rear side. A substantially rectangular plate-shaped second permitting plate 34C (see FIG. 10A), serving as a second permitting portion (retaining portion), is integrally provided to a lower end of a rear wall of the lock frame 34A. The second permitting plate 34C projects toward the rear side, and has a left face that slopes toward the left side on progression toward the front side.

A solenoid 36, serving as a second actuation device, is provided on the left side of a rear portion of the N-position link 34. A plunger 36A of the solenoid 36 extends toward the right, and a right end portion of the plunger 36A is mechanically coupled to a rear portion of the N-position link 34 (see FIG. 10A). The right end portion of the plunger 36A is capable of rotating and also capable of sliding with respect to the rear portion of the N-position link 34. When the N-position locking unit 32 is actuated, a current is passed through the solenoid 36, and the plunger 36A is pulled toward the left by magnetic force generated by the solenoid 36. The N-position link 34 is thereby swung toward the left side by the plunger 36A so as to be placed at an N-position locking position (second locking position) (see FIG. 7A).

Figure 7A:
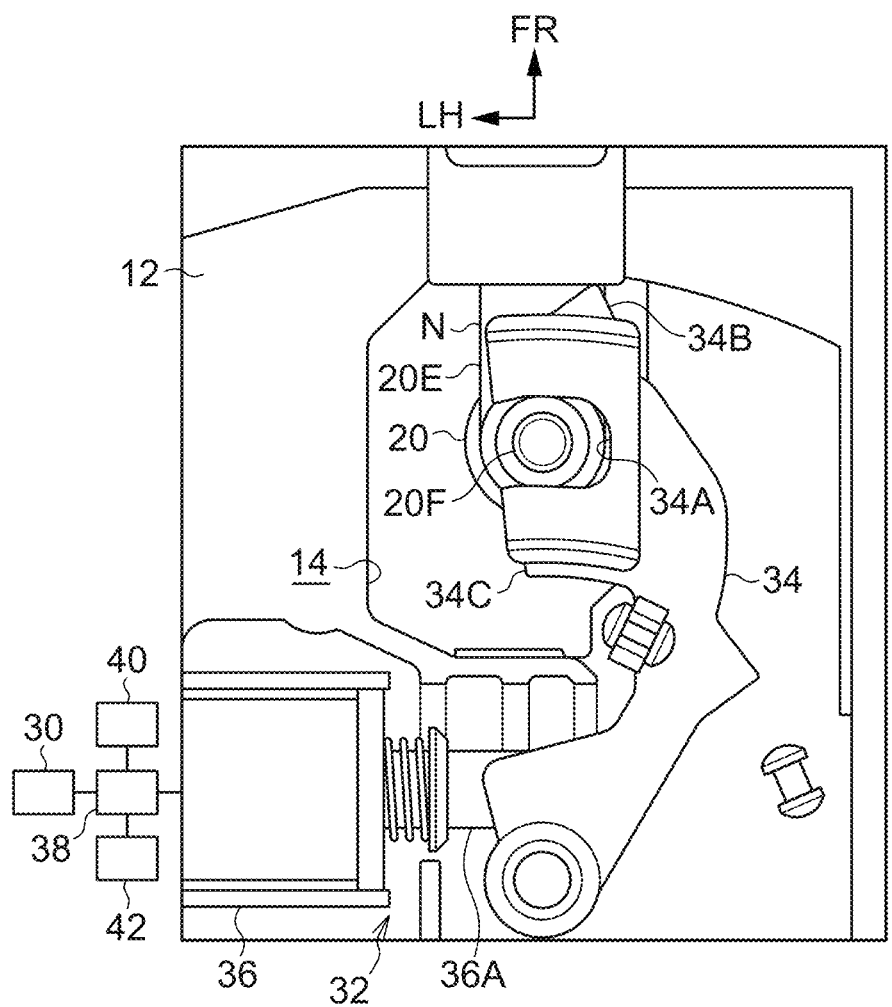
FIG. 7A and FIG. 7B are face-on views illustrating actions of an N-position locking unit of a shift device according to an exemplary embodiment of the present disclosure as viewed from an upper side, FIG. 7A illustrating a locked state, and FIG. 7B illustrating an unlocked state.

As illustrated in FIG. 7A, the electromagnet 30 of the P-position locking unit 22 and the solenoid 36 of the N-position locking unit 32 are electrically connected to a control device 38 of the vehicle. A brake 40 of the vehicle, serving as a release operation section, is electrically connected to the control device 38. The vehicle is made to brake when the brake 40 is operated by the occupant. An N-position locking switch 42 of the vehicle, serving as an actuation operation section, is also electrically connected to the control device 38. The N-position locking switch 42 can be activated and deactivated by being operated by the occupant. In cases in which the brake 40 is operated and in cases in which the N-position locking switch 42 is activated, a current is passed through the electromagnet 30 (the P-position locking unit 22 is actuated) under the control of the control device 38, and a current is also passed through the solenoid 36 (the N-position locking unit 32 is actuated) under the control of the control device 38.

Next, explanation follows regarding operation of the present exemplary embodiment.

In the shift device 10 with the above configuration, in cases in which the brake 40 is not operated while the lever 20 is disposed at the "P" position, the P-position locking unit 22 is not actuated and a current is not passed through the electromagnet 30. Thus, the electromagnet 30 does not stick to the intermediate link 26, and the intermediate link 26 is not capable of swinging integrally with the release link 28 (see FIG. 5A). Thus, if the knob button 20C of the lever 20 is operated such that the detent pin 20D of the lever 20 moves toward the lower side, although the detent pin 20D presses the upper face of the release plate 28A of the release link 28 toward the lower side such that the release link 28 is swung toward the front side, the intermediate link 26 does not swing toward the front side integrally with the release link 28, and so the P-position link 24 remains disposed at the P-position locking position. Movement of the detent pin 20D toward the lower side (toward the release position) is thereby restricted by the upper face of the lock plate 24A of the P-position link 24, such that the detent pin 20D abuts the front face of the detent protrusion 18 (front protrusion 18A) of the gate plate 16, and pivoting of the lever 20 from the "P" position toward the rear side ("R" position side) is locked.

On the other hand, in cases in which the brake 40 is operated while the lever 20 is disposed at the "P" position, the P-position locking unit 22 is actuated and a current is passed through the electromagnet 30. Thus, the electromagnet 30 sticks to the intermediate link 26, and the intermediate link 26 capable of swinging integrally with the release link 28 (see FIG. 5B). Thus, if the knob button 20C is operated such that the detent pin 20D moves toward the lower side, the detent pin 20D presses the upper face of the release plate 28A of the release link 28 toward the lower side and the release link 28 is swung toward the front side, such that the intermediate link 26 is swung toward the front side integrally with the release link 28, and the P-position link 24 is swung toward the front side by the intermediate link 26. Thus, the detent pin 20D moves toward the lower side at the rear side of the release plate 28A of the release link 28 and the rear side of the lock plate 24A of the P-position link 24 so as to be placed at the release position, such that the detent pin 20D is capable of pivoting at the lower side of the detent protrusion 18 (the front protrusion 18A and the rear protrusion 18B), and pivoting of the lever 20 from the "P" position toward the rear side ("R" position side) is unlocked.

In cases in which the N-position locking switch 42 is activated while the lever 20 is disposed at the "N" position, the N-position locking unit 32 is actuated and a current is passed through the solenoid 36. Thus, the N-position link 34 is swung toward the left side by the plunger 36A of the solenoid 36 so as to be placed at the N-position locking position (see FIG. 7A). Since the lock pin 20F of the lever 20 is thereby placed inside the lock frame 34A of the N-position link 34, pivoting of the lock pin 20F toward the front side and the rear side is restricted by the front wall and the rear wall of the lock frame 34A respectively, such that pivoting of the lever 20 toward the front side (the "R" position side) and the rear side (the "D" position side) is locked.

Figure 7B:
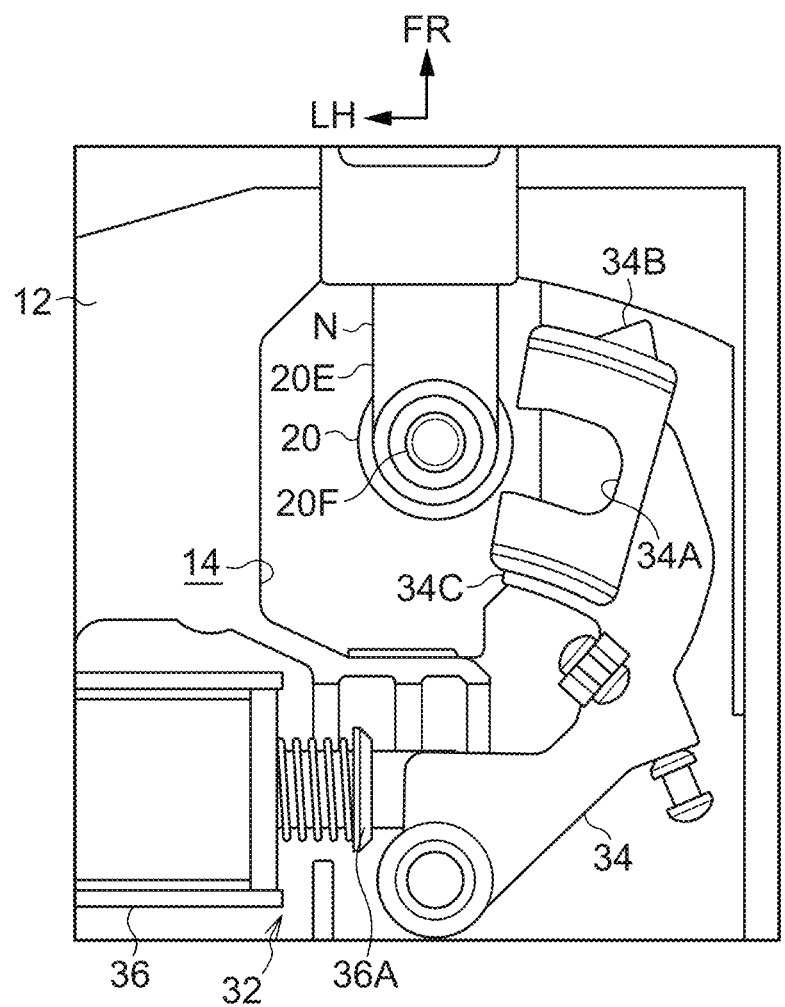

On the other hand, in cases in which the N-position locking switch 42 is not activated (remains deactivated) while the lever 20 is disposed at the "N" position, the N-position locking unit 32 is not actuated and a current is not passed through the solenoid 36, and so the N-position link 34 is not swung toward the left side (see FIG. 7B). Thus, pivoting of the lock pin 20F toward the front side and the rear side is not restricted, and pivoting of the lever 20 toward the front side (the "R" position side) and the rear side (the "D" position side) is unlocked.

Note that pivoting of the lever 20 from the "P" position and pivoting of the lever 20 from the "N" position are locked by different units, these being the P-position locking unit 22 and the N-position locking unit 32 respectively. This obviates the need to provide a lever 20 with a configuration that matches a positional relationship between the "P" position and the "N" position of the lever 20. This enables greater degrees of freedom for the positional relationship between the detent pin 20D and the lock pin 20F of the lever 20, thereby enabling greater degrees of freedom for the configuration of the lever 20.

Furthermore, the P-position locking unit 22 and the N-position locking unit 32 are respectively disposed at the front side and the rear side of (externally to) the lever 20. Thus, the P-position locking unit 22 and the N-position locking unit 32 are not disposed inside the lever 20, thereby enabling the lever 20 to be made smaller in size.

Moreover, the P-position locking unit 22 is configured by causing the P-position link 24 to swing, and the N-position locking unit 32 is configured by causing the N-position link 34 to swing. This enables the configuration of the P-position locking unit 22 to be simplified, and also enables the configuration of the N-position locking unit 32 to be simplified.

Moreover, in cases in which the brake 40 is operated and also in cases in which the N-position locking switch 42 is activated, the P-position locking unit 22 (electromagnet 30) and the N-position locking unit 32 (solenoid 36) are actuated at the same time under the control of the control device 38. This enables the control of the P-position locking unit 22 and the N-position locking unit 32 by the control device 38 to be simplified, thereby enabling the configuration of the control device 38 to be simplified.

Furthermore, swinging of the lever 20 from the "P" position can be unlocked by actuating the P-position locking unit 22 while the lever 20 is disposed at the "P" position. Moreover, swinging of the lever 20 from the "N" position can be locked by actuating the N-position locking unit 32 while the lever 20 is disposed at the "N" position. Thus, in the present exemplary embodiment, in cases in which the brake 40 is operated and also in cases in which the N-position locking switch 42 is activated, the control device 38 actuates the P-position locking unit 22 (electromagnet 30) and the N-position locking unit 32 (solenoid 36) irrespective of the shift position of the lever 20. This enables the control of the P-position locking unit 22 and the N-position locking unit 32 by the control device 38 to be further simplified, thereby enabling the configuration of the control device 38 to be further simplified.

Moreover, the P-position link 24 remains disposed at the P-position locking position in cases in which the P-position locking unit 22 is actuated and also in cases in which the P-position locking unit 22 is not actuated. Note that in cases in which the P-position link 24 is disposed at the P-position locking position, if the lever 20 is pivoted from the "R" position toward the front side ("P" position side) in a state in which the knob button 20C has been operated such that the detent pin 20D is disposed at the release position (lower side), the detent pin 20D presses the rear face of the release plate 28A of the release link 28 and the rear face of the lock plate 24A of the P-position link 24 toward the front side, such that the release link 28 and the P-position link 24 (including the intermediate link 26) are swung toward the front side (see FIG. 5B). If operation of the knob button 20C is then released such that the detent pin 20D moves toward the upper side at the rear side of the release plate 28A and the rear side of the lock plate 24A, the detent pin 20D is placed at the restrict position so as to be placed at the front side of the detent protrusion 18 (front protrusion 18A) (see FIG. 5A). Thus, even in cases in which the P-position link 24 is disposed at the P-position locking position, the lever 20 can be pivoted from the "R" position (a position where the vehicle is driven in reverse) to the "P" position (a position where the vehicle is not driven).

Figure 8B:
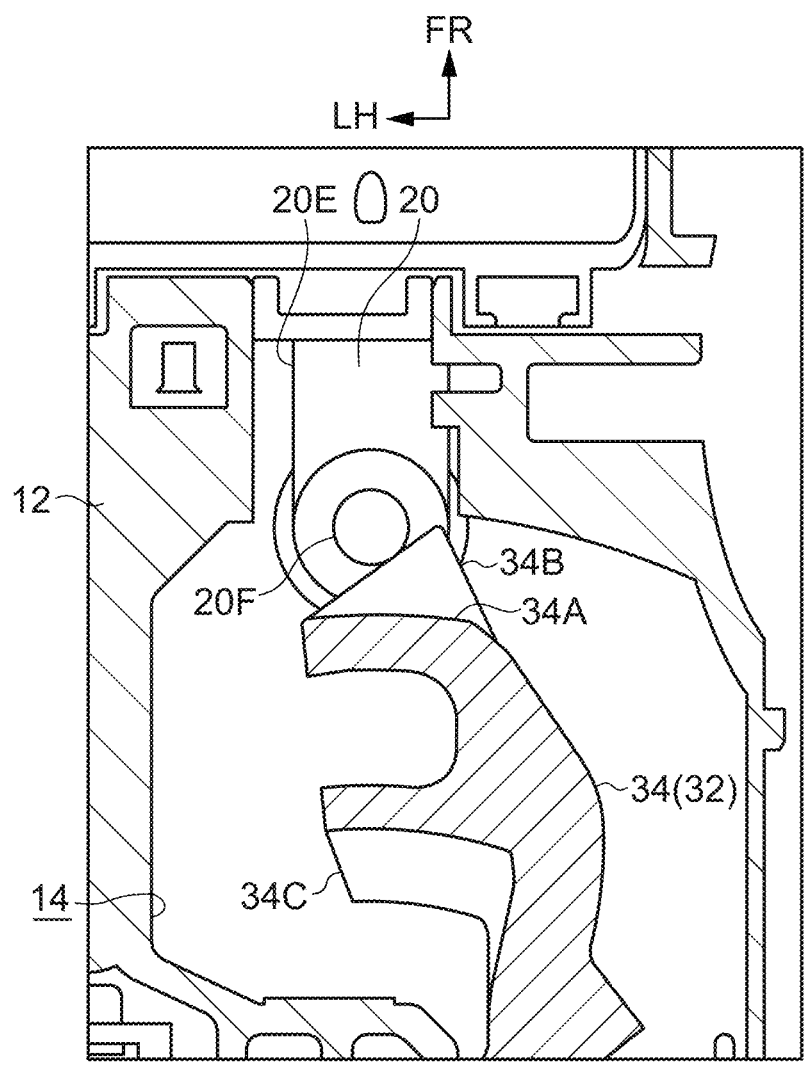
Figure 9A:
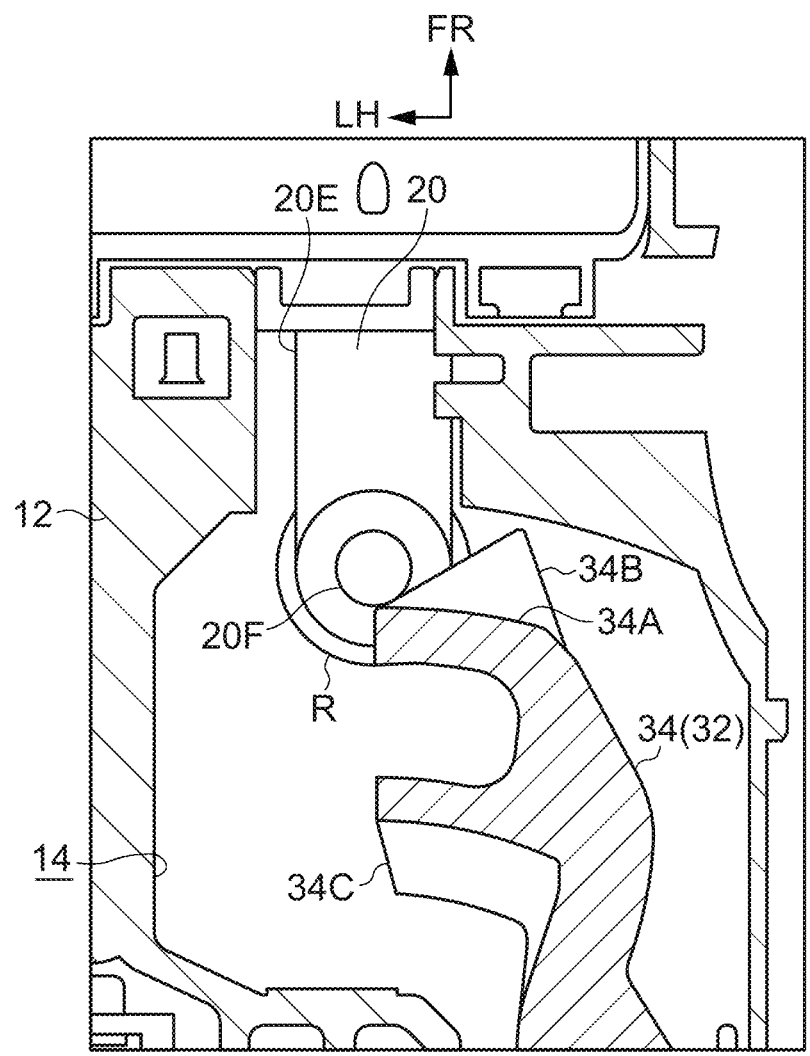
FIG. 9A and FIG. 9B are cross-sections illustrating a case in which a lever is pivoted from a "P" position to an "N" position while an N-position locking unit of a shift device according to an exemplary embodiment of the present disclosure is in a locked state as viewed from an upper side, FIG. 9A illustrating the lever disposed at an "R" position, and FIG. 9B illustrating the lever disposed at the "N" position.
Figure 9B:
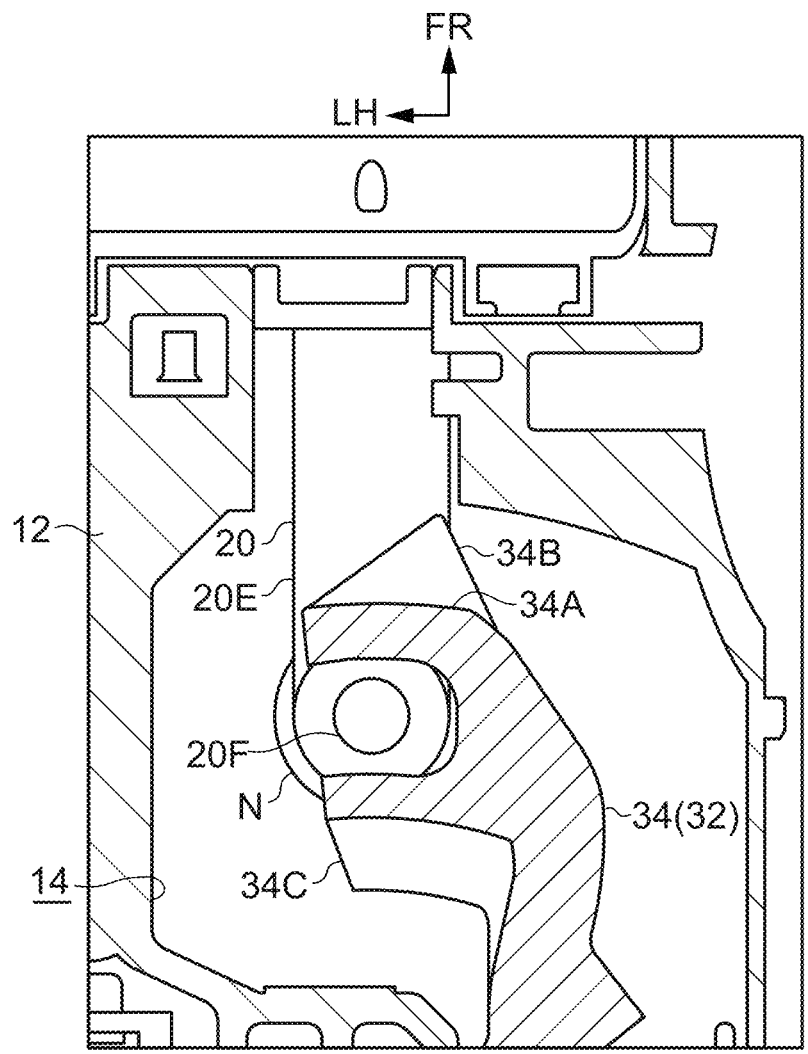

Furthermore, for example, in cases in which the lever 20 is pivoted from the "P" position toward the rear side soon after the P-position locking unit 22 has been actuated (and also after the N-position locking unit 32 has been actuated), and in cases in which the lever 20 is pivoted from the "P" position toward the rear side in a state in which the N-position locking unit 32 has malfunctioned while actuated, the lever 20 can be pivoted from the front side to the "N" position side in a state in which the N-position link 34 is disposed at the N-position locking position. Note that if the lever 20 is pivoted from the front side to the "N" position side while the N-position link 34 is disposed at the N-position locking position, the lock pin 20F of the lever 20 presses the left face of the first permitting plate 34B of the N-position link 34 from the rear side such that the N-position link 34 is swung toward the right side, and pivoting of the lever 20 from the front side toward the "N" position is thereby permitted (see FIG. 8A, FIG. 8B, and FIG. 9A). Thus, by pivoting the lever 20 to the "N" position, the N-position link 34 is swung toward the left side by the plunger 36A of the solenoid 36, and the lock pin 20F is placed inside the lock frame 34A of the N-position link 34 (see FIG. 9B). Thus, even in cases in which the N-position link 34 is disposed at the N-position locking position, the lever 20 can be pivoted from the "R" position (a position where the vehicle is driven in reverse) to the "N" position (a position where the vehicle is not driven).

Figure 10B:
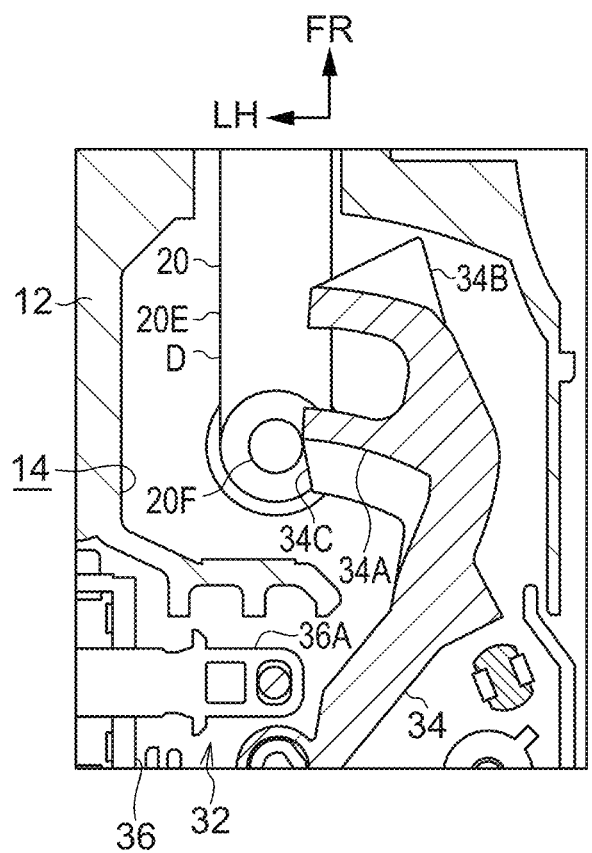
Figure 10C:
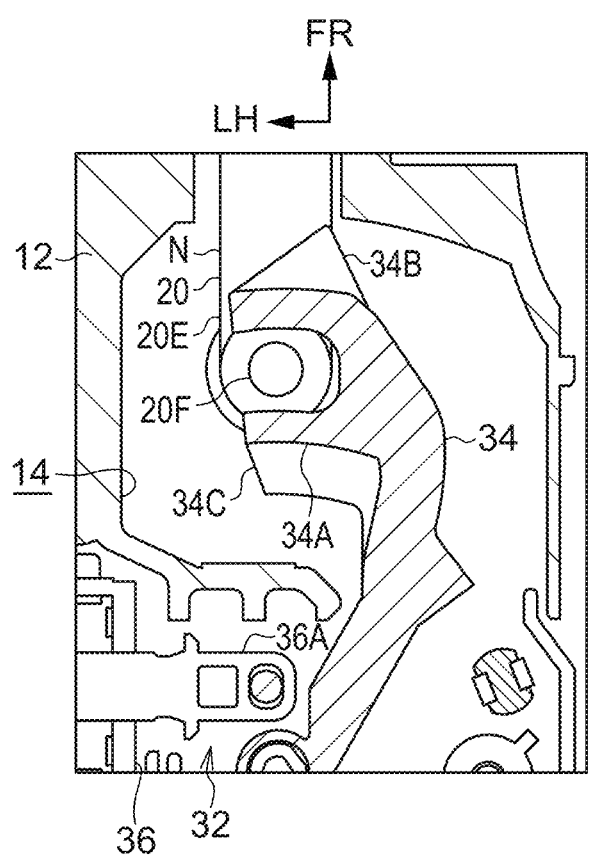

Moreover, for example, in cases in which the lever 20 is pivoted from the "S" position toward the front side via the "D" position in a state in which the N-position locking unit 32 has malfunctioned while actuated, the lever 20 can be pivoted from the "S" position to the "N" position side in a state in which the N-position link 34 is disposed at the N-position locking position. Note that if the lever 20 is pivoted from the "S" position to the "N" position side while the N-position link 34 is disposed at the N-position locking position, the lock pin 20F of the lever 20 presses the left face of the second permitting plate 34C of the N-position link 34 from the right side and the front side, such that the N-position link 34 is swung toward the right side and the N-position link 34 is retained in a state swung toward the right side (see FIG. 10B). Thus, by pivoting the lever 20 to the "N" position, the N-position link 34 is swung toward the left side by the plunger 36A of the solenoid 36, and the lock pin 20F is placed inside the lock frame 34A of the N-position link 34 (see FIG. 10C). Thus, even in cases in which the N-position link 34 is disposed at the N-position locking position, the lever 20 can be pivoted from the "D" position, the "S" position, the "+" position, or the "−" position (positions where the vehicle is driven forward) to the "N" position (a position where the vehicle is not driven).

Moreover, in cases in which pivoting of the lever 20 from the "P" position toward the rear side is locked, movement of the detent pin 20D toward the lower side (in the pivot radial direction of the lever 20) is restricted by the P-position link 24. Thus, movement of the detent pin 20D that has a small movement load in the pivot radial direction of the lever 20 can be restricted by the P-position link 24 that is pivotably supported and has a small load restricting capability, thereby enabling movement of the detent pin 20D to be restricted while suppressing damage to the P-position link 24.

Furthermore, in cases in which pivoting of the lever 20 from the "P" position toward the rear side is locked, pivoting of the lever 20 is restricted by the detent protrusion 18 of the gate plate 16. Thus, even if an occupant pivots the lever 20 with a large force while the lever 20 is disposed at the "P" position and the vehicle is not being driven, this pivoting of the lever 20 under the large force can be restricted by the gate plate 16 (detent protrusion 18) that is fixed to the plate 12 and has a large load restricting capability, thereby enabling pivoting of the lever 20 under this large force to be restricted while suppressing damage to the gate plate 16 (detent protrusion 18).

Moreover, in cases in which pivoting of the lever 20 from the "N" position is locked, pivoting of the lever 20 (lock pin 20F) is restricted by the N-position link 34. Thus, if the occupant driving the vehicle while the lever 20 is disposed at the "N" position applies a small force to pivot the lever 20, pivoting of the lever 20 under this small force can be restricted by the N-position link 34 that is pivotably supported and has a small load restricting capability, thereby enabling pivoting of the lever 20 to be restricted while suppressing damage to the N-position link 34.

Note that the lever 20 (shift body) is pivoted in the present exemplary embodiment. However, a shift body may be configured to as to be slid.

Furthermore, the first shift position is the "P" position and the second shift position is the "N" position in the present exemplary embodiment. However, at least one position out of the first shift position or the second shift position may be set to a shift position other than the "P" position or the "N" position.

The shift device 10 is installed to the console in the present exemplary embodiment. However, the shift device 10 may be installed to an instrument panel or to a steering column.

What is claimed is:

1. A shift device comprising:
    a shift body configured to be moved to change a shift position;
    a first locking mechanism provided with a first lock member, the first locking mechanism being configured so as not to be electrically actuated such that the first lock member is disposed at a first locking position to lock movement of the shift body from a first shift position, and the first locking mechanism being configured so as to be electrically actuated such that the first lock member permits movement of the shift body from the first shift position; and
    a second locking mechanism provided with a second lock member configured to move separately from the first lock member, the second locking mechanism being configured so as to be electrically actuated such that the second lock member is disposed at a second locking position to lock movement of the shift body from a second shift position.

2. The shift device of claim 1, wherein the first locking mechanism and the second locking mechanism are configured so as to be electrically actuated at the same time.

3. The shift device of claim 1, wherein at least one mechanism out of the first locking mechanism or the second locking mechanism is configured so as to be electrically actuated irrespective of the shift position of the shift body.

4. The shift device of claim 1, wherein in cases in which the first shift position is a park position and the first lock member is disposed at the first locking position, the first lock member permits movement of the shift body to the first shift position from a position other than the first shift position.

5. The shift device of claim 1, wherein in cases in which the second shift position is a neutral position and the second lock member is disposed at the second locking position, the second lock member permits movement of the shift body to the second shift position from a position other than the second shift position.

6. The shift device of claim 1, further comprising a permitting portion that is provided to the second lock member and that is configured to permit movement of the shift body from the first shift position to the second shift position.

7. The shift device of claim 1, further comprising a retaining portion that is provided to the second lock member and that is configured to retain the second lock member at a position separated from the second locking position in cases in which the shift body is disposed at a predetermined shift position other than the second shift position.

8. The shift device of claim 1, wherein at least one mechanism out of the first locking mechanism or the second locking mechanism is disposed externally to the shift body.

9. A shift device comprising:
    a shift body configured to be moved to change a shift position;
    a first locking mechanism provided with a first lock member, the first lock member being disposed at a first locking position to lock movement of the shift body from a park position; and a second locking mechanism provided with a second lock member configured to move separately from the first lock member, the second lock member being configured so as to be electrically actuated such that the second lock member is disposed at a second locking position to lock movement of the shift body from a neutral position to both sides in a movement direction of the shift body.

\* \* \* \* \*